UNITED STATES PATENT OFFICE.

JEAN BAPTISTE PINCHARD, OF CHICAGO, ILLINOIS.

PREPARED FOOD FOR HORSES.

SPECIFICATION forming part of Letters Patent No. 355,837, dated January 11, 1887.

Application filed October 31, 1885. Serial No. 181,455. (No specimens.)

*To all whom it may concern:*

Be it known that I, JEAN BAPTISTE PINCHARD, a citizen of the United States, residing at Chicago, in the county of Cook and State of Illinois, have invented certain new and useful Improvements in Prepared Food for Horses, &c., of which the following is a specification, to wit:

This invention relates to prepared food for horses, &c.; and it consists in certain combinations of ingredients mixed and prepared substantially as will be hereinafter more fully set forth and claimed.

In order to enable others skilled in the art to which my invention pertains to avail themselves of its benefits, I will now proceed to describe its compounding and use.

I take such grains as are ordinarily used in feeding horses and cattle—such as oats, wheat, barley, bran, &c.—and grind or reduce them to flour in any desired or suitable manner, using any of them that may be desired for cheapness and nutrition. To a given quantity of the desired grain so prepared I add the hulls or residue of flaxseed obtained after expressing the oil in about the same quantity as the grain used. This is thoroughly mixed with water and a small quantity of yeast added, sufficient to cause the dough to rise, this method being exactly the same commonly used in making bread, and after being allowed to rise it is formed into loaves and baked similar to bread. The loaves so formed will keep for an indefinite time without losing their quality, and when desired for use they are cut or broken into small lumps and either fed to the animal plain or preferably mixed with a quantity of finely-cut hay or straw.

As before stated, any grain is used that by quality or cheapness is desirable, and though usually the grain and flaxseed-hulls are mixed in about equal quantities, yet I do not desire to confine myself to these proportions, as they will be varied according to the quality and cost of the food it is desired to make. The flaxseed-hulls after pressing are preferred to the seed before pressing, as the expression of the oil renders the product easier of digestion, and such refuse from the presses is of but small cost and cheapens the food produced.

This food is of good quality, and when prepared and fed as above stated forms a wholesome and easily-digested article, fattening and strengthening the animal, and, as a much less quantity is required than of ordinary feed, it is easily transported, and is of special value for army and similar uses.

Having thus fully described my invention, what I claim as new, and desire to secure by Letters Patent, is—

The herein-described animal-food, consisting of a mixture or loaf of ground grain and flaxseed-hulls, substantially as described, and for the purpose set forth.

In testimony whereof I affix my signature in presence of two witnesses.

JEAN BAPTISTE PINCHARD.

Witnesses:
W. C. MACARTHUR,
CHAS. C. TILLMAN.